United States Patent
Niculescu-Mizil et al.

(10) Patent No.: US 10,162,879 B2
(45) Date of Patent: Dec. 25, 2018

(54) LABEL FILTERS FOR LARGE SCALE MULTI-LABEL CLASSIFICATION

(71) Applicant: NEC Laboratories America, Inc., Princeton, NJ (US)

(72) Inventors: Alexandru Niculescu-Mizil, Plainsboro, NJ (US); Mohammad Ehsan Abbasnejad, Canberra (AU)

(73) Assignee: NEC Corporation (JP)

( * ) Notice: Subject to any disclaimer, the term of this patent is extended or adjusted under 35 U.S.C. 154(b) by 239 days.

(21) Appl. No.: 15/148,776

(22) Filed: May 6, 2016

(65) Prior Publication Data

US 2016/0328466 A1 Nov. 10, 2016

Related U.S. Application Data

(60) Provisional application No. 62/158,597, filed on May 8, 2015.

(51) Int. Cl.
G06F 17/30 (2006.01)

(52) U.S. Cl.
CPC .............................. G06F 17/30598 (2013.01)

(58) Field of Classification Search
CPC .................................................. G06F 17/30598
See application file for complete search history.

(56) References Cited

U.S. PATENT DOCUMENTS

| 8,171,509 B1* | 5/2012 | Girouard | G06Q 30/0241 705/14.4 |
| 9,565,078 B1* | 2/2017 | Smith | H04L 43/04 |
| 2007/0043722 A1* | 2/2007 | MacNamee | G06K 9/6253 |
| 2007/0109301 A1* | 5/2007 | Smith | G05B 23/0254 345/440 |
| 2008/0091549 A1* | 4/2008 | Chang | G06Q 30/02 705/14.66 |
| 2016/0246786 A1* | 8/2016 | Kostirev | G06F 17/3028 |

OTHER PUBLICATIONS

Agrawal, R. et al., "Multi-Label Learning with Millions of Labels: Recommending Advertiser Bid Phrases for Web Pages," Proceedings of the 22nd international conference on World Wide Web, May 2013. (pp. 1-11).

Bengio, S. et al., "Label Embedding Trees for Large Multi-Class Tasks," Advances in Neural Information Processing Systems, Dec. 2010. (pp. 1-9).

(Continued)

*Primary Examiner* — Tarek Chbouki
(74) *Attorney, Agent, or Firm* — Joseph Kolodka

(57) ABSTRACT

Systems and methods for assigning labels to an object are provided. A set of labels is assigned to at least one object. A label filter is applied to the set of labels and to the object and labels that are irrelevant to the object are identified by the label filter. The irrelevant labels are then eliminated from further consideration and a subset of labels are created. Labels from the subset of labels that are relevant to the object are then determined and assigned to the object. The elimination of the irrelevant labels increases the speed of the labeling process. A determination of which of the objects are relevant to a user may then be performed to create user-oriented content.

17 Claims, 5 Drawing Sheets

(56) References Cited

OTHER PUBLICATIONS

Bently, J.L., "Multidimensional Binary Search Trees Used for Associative Searching," Communications of the ACM, vol. 18, No. 9, Sep. 1975. (pp. 1-9).
Beygelzimer, A. et al., "Error-Correcting Tournaments," Proceedings of the 20th international conference on Algorithmic learning theory, Oct. 2009. (pp. 1-15).
Bhatia, K. et al., "Sparse Local Embeddings for Extreme Multi-label Classification," Advances in Neural Information Processing Systems, Dec. 2015. (pp. 1-9).
Bi, W. et al., "Efficient Multi-label Classification with Many Labels," Proceedings of the 30th International Conference on Machine Learning, Jun. 2013. (pp. 1-9).
Chen, Y.N. et al., "Feature-aware Label Space Dimension Reduction for Multi-label Classification," Advances in Neural Information Processing Systems, Dec. 2012. (pp. 1-9).
Cisse, M. et al., "Learning compact class codes for fast inference in large multi class classification," Machine Learning and Knowledge Discovery in Databases, Sep. 2012. (pp. 1-15).
Cisse, M. et al., "Robust Bloom Filters for Large Multilabel Classification Tasks," Advances in Neural Information Processing Systems 26, Dec. 2013. (pp. 1-9).
Crammer, K. et al., "On the Algorithmic Implementation of Multiclass Kernel-based Vector Machines," Journal of Machine Learning Research, vol. 2, Mar. 2002. (pp. 1-28).
Deng, J. et al., "Fast and Balanced: Efficient Label Tree Learning for Large Scale Object Recognition," Advances in Neural Information Processing Systems 24, Dec. 2011. (pp. 1-9).
Deng, J. et al., "ImageNet: A Large-Scale Hierarchical Image Database," IEEE Conference on Computer Vision and Pattern Recognition, Jun. 2009. (pp. 1-8).
Gao, T. et al., "Discriminative Learning of Relaxed Hierarchy for Large-scale Visual Recognition," IEEE International Conference on Computer Vision, Oct. 2011. (pp. 1-8).
Hsu, D. et al. ,"Multi-Label Prediction via Compressed Sensing," Advances in Neural Information Processing Systems 22, Dec. 2009. (pp. 1-16).
Indyk, P. et al., "Approximate Nearest Neighbors: Towards Removing the Curse of Dimensionality," Proceedings of the thirtieth annual ACM symposium on Theory of computing, May 1998. (pp. 604-613).
Ji, S. et al. "Extracting Shared Subspace for Multi-label Classification," Proceedings of the 14th ACM SIGKDD International conference on Knowledge discovery and data mining, Aug. 2008. (pp. 1-9).
Liu et al., "Support Vector Machines Classification with a Very Large-scale Taxonomy," ACM SIGKDD Explorations Newsletter—Natural language processing and text mining, vol. 7, No. 1, Jun. 2005. (pp. 1-8).
Partalas, I. et al., "LSHTC: A Benchmark for Large-Scale Text Classification," Clinical Orthopaedics and Related Research, Mar. 2015. (pp. 1-9).
Prabhu, Y. et al., "FastXML: A Fast, Accurate and Stable Tree-classifier for eXtreme Multi-label Learning," Proceedings of the 20th ACM SIGKDD international conference on Knowledge discovery and data mining, Aug. 2014. (pp. 1-10).
Weston, J. et al., "Label Partitioning for Sublinear Ranking," Proceedings of the 30 th International Conference on Machine Learning, Jun. 2013. (pp. 1-9).
Wetzker, R. et al., "Analyzing Social Bookmarking Systems: A del.icio.us Cookbook," in Mining Social Data (MSoDa) Workshop Proceedings, Jul. 2008. (pp. 1-5).
Zubiaga, A. et al., "Enhancing Navigation on Wikipedia with Social Tags," 5th International Conference of the Wikimedia Community, Feb. 2012. (pp. 1-9).

* cited by examiner

LABEL FILTERS FOR LARGE SCALE MULTI-LABEL CLASSIFICATION

RELATED APPLICATION INFORMATION

This application claims priority to provisional U.S. Patent Application No. 62/158,597 filed on May 8, 2015, incorporated herein by reference in its entirety.

BACKGROUND

Technical Field

The present invention relates to label filtering and more particularly to a label filtering system for preselecting a number of labels for consideration by a multi-label classifier.

Description of the Related Art

With the advent of big data, classifiers can make more and more fine-grained distinctions between various classes, leading to the rise of classification problems with very large numbers of labels. Data sets with tens and hundreds of thousands of labels are already becoming standard benchmarks in domains such as, e.g., object recognition and text classification. Additionally, multi-label problems with millions of labels have recently been tacked into the literature. As more and more data becomes available, the number of problems with large label sets, as well as with the number of labels per problem, is going to increase.

One consequence of the explosion in the number of labels is a significant increase in the test time (production time) computational burden. Most approaches to multiclass and multi-label classification, such as, e.g., the popular one-vs-all scheme or the Crammer-Singer multiclass SVM, have to systematically evaluate the match between each label and the test instance in order to make a prediction, leading to a test-time complexity that is linear in the number of labels. As the number of labels grows, the systematic evaluation of all labels becomes prohibitive, especially for applications that require real-time response and/or have limited computational resources. In problems with a large number of labels, most multi-label and multiclass techniques incur a significant computational burden at test time.

SUMMARY

According to an aspect of the present principles, a method is provided for assigning labels to an object. The method includes receiving, by a storage device, a set of labels and at least one object to be assigned labels, and applying, using a processor, a label filter to the set of labels and to each of the at least one objects. The method further includes identifying, for each of the at least one objects, which labels in the set of labels are irrelevant, and eliminating labels in the set of labels that are irrelevant to each of the at least one objects, based on relevancy criteria, from further consideration. The method further includes creating, using the processor, a subset of labels for each of the at least one objects, the subset of labels consisting of labels in the set of labels that have not been eliminated from consideration. The method further includes determining, using a multi-label classifier, for each of the at least one objects, which labels in the subset of labels are relevant to the object by analyzing the subset of labels in conjunction with the object. The method further includes assigning, to each of the at least one objects, the labels that are relevant to the object. The method additionally includes determining, using the processor, which of the at least one objects are relevant to a user, based on the labels assigned to each of the at least one objects, to create user-oriented content, the user-oriented content consisting of at least one object determined to be relevant to a user, and displaying the user-orientated content to the user.

According to another aspect of the present principles, a system is provided for assigning labels to an object. The system includes a storage device configured to store a set of labels and at least one object to be assigned labels. The system further includes at least one processor configured to: apply a label filter to the set of labels and to each of the at least one objects; identify which labels in the set of labels are irrelevant to each of the at least one objects; eliminate labels in the set of labels that are irrelevant to each of the at least one objects, based on relevancy criteria, from further consideration; create a subset of labels, for each of the at least one objects, consisting of labels in the set of labels that have not been eliminated from consideration; analyze, for each of the at least one objects, the subset of labels in conjunction with the object; determine which labels in the subset of labels are relevant to each of the at least one objects; assign, to the object, the labels that are relevant to the object; determine, based on the labels assigned to each of the at least one objects, which of the at least one objects are relevant to a user in order to create user-oriented content, the user-oriented content consisting of at least one object determined to be relevant to a user; and display the user-orientated content to the user.

According to another aspect of the present principles, a non-transitory computer-readable storage medium including a computer-readable program for assigning labels to an object is provided. The computer-readable program when executed on a computer causes the computer to perform the steps of: receiving, by a storage device, a set of labels and at least one object to be assigned labels; applying, using a processor, a label filter to the set of labels and to each of the at least one objects; identifying, for each of the at least one objects, which labels in the set of labels are irrelevant; eliminating labels in the set of labels that are irrelevant to each of the at least one objects, based on relevancy criteria, from further consideration; creating, using the processor, a subset of labels for each of the at least one objects, the subset of labels consisting of labels in the set of labels that have not been eliminated from consideration; determining, using a multi-label classifier, for each of the at least one objects, which labels in the subset of labels are relevant to the object by analyzing the subset of labels in conjunction with the object; assigning, to each of the at least one objects, the labels that are relevant to the object; determining, using the processor, which of the at least one objects are relevant to a user, based on the labels assigned to each of the at least one objects, to create user-oriented content, the user-oriented content consisting of at least one object determined to be relevant to a user; and displaying the user-orientated content to the user.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
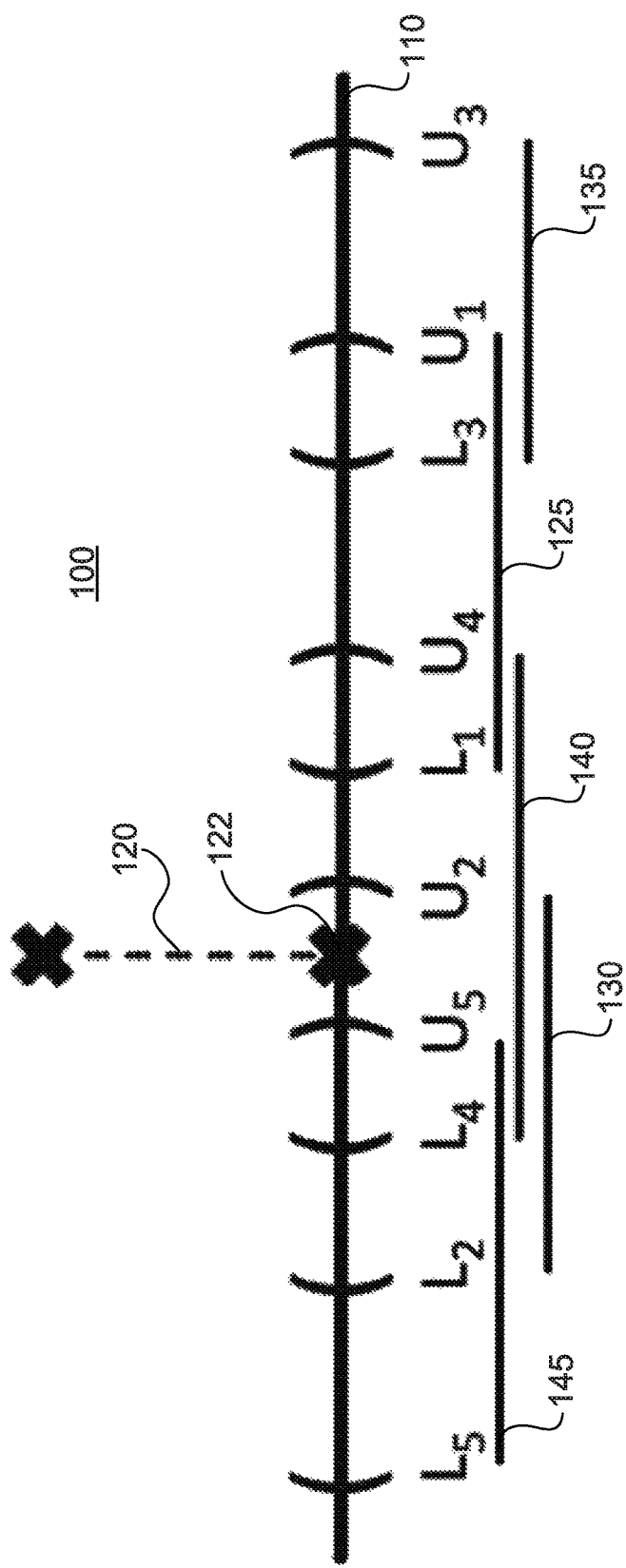
FIG. 1 is a diagram of an exemplary 2-dimensional label filter with five labels, in accordance with an embodiment of the present principles.

Labels are used to identify certain descriptive aspects of an item so that the item may be more easily classified and located. For example, a paper that discusses methods for filtering labels may be assigned labels such as, e.g., "extreme classification," "multi-label," "optimization," "large-scale learning," "big data," etc. These labels may be relevant to the subject-matter contained within the paper. There are, however, a vast number of possible labels, such as, e.g., "Gaussian processes," "social networks," "cook book," etc., that would not be relevant to the classification of such a paper.

To search through all of the irrelevant labels to determine the relevant labels is time consuming. However, if a number of the tags that have a low likelihood of relevancy were removed prior to the determination of whether the remaining labels are relevant, the determination of the relevancy of the remaining labels would be much less time-consuming than the determination of the entire list of labels.

In accordance with the present principles, systems and methods are provided for using label filters to efficiently preselect a small set of potentially relevant labels for a multi-label classifier to consider. By decreasing the number of labels that the multi-label classifier considers, the time required to predict relevant labels is dramatically reduced.

Classifiers are trained to identify labels in a label set that are relevant to a particular test example. Label filters, as opposed to classifiers, are specifically trained to identify labels in a label set that have a high likelihood of being irrelevant to the particular test example and thus can be safely eliminated from consideration by the classifier prior to the classifier identifying the relevancy of the labels in the label set.

Typically, identifying labels that have a high likelihood of being irrelevant is simpler and less time-consuming that identifying labels that are relevant. Because of this, many labels can typically be eliminated from consideration in a single iteration of the label filters without having to consider each of the labels individually.

Label filters possess a number of appealing and/or unique properties. First, label filters can be used to speed up any multi-label classifier that requires a linear scan over the labels in a label set. This affords a user the flexibility to use the best classifier for the task at hand, which can yield significant performance gains. Second, label filters can be learned directly from data in a principled manner by, e.g., solving an intuitive constraint optimization problem. Third, label filters can be trained independently of a base multi-label classifier. This greatly simplifies the use of the label filters, eliminating a need for joint-parameter selection or retraining when a multi-label classifier changes. Fourth, label filters can reduce the prediction times of multi-label classifiers by orders of magnitude without significantly impacting the performance of the multi-label classifiers.

In an embodiment of the present principles, one or more label filters are applied to the original set of labels, prior to the use of the multi-label classifier. These label filters eliminate from consideration labels in a label set that are unlikely to be relevant. The multi-label classifier subsequently tests the remaining labels in the label set for relevancy.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, an exemplary 2-dimensional label filter 100 with five labels is illustratively depicted in accordance with an embodiment of the present principles.

In an embodiment, the label filter 100 is designed to speed up the labeling process at a test time (production time) by reducing the number of labels that are to be considered by a base multiclass or multi-label classifier. For each test example 120, the label filter 100 selects certain labels for consideration and evaluation by a base classifier. All labels not selected by the label filter 100 are deemed irrelevant for the given test example and excluded from further consideration.

In an embodiment, the label filter consists of a filtering manifold 110 and a set of active regions corresponding to each label {125, 130, 135, 140, 145}. The filtering manifold is a geometric structure that admits a projection operation. The active regions are subsets of the filtering manifold, each active region being associated with a particular label. An example filtering manifold is a hyper-line in d-dimensional space with active regions comprised of a set of intervals on this hyper-line, each interval having an upper boundary ($U_n$) and a lower boundary ($L_n$). A test example 120 is projected onto a filter line 110 through the projection operation. The labels corresponding to the active regions that contain the projection 122 are selected by the label filter. The labels corresponding to active regions that do not include the projection 122 are eliminated.

In the example shown in FIG. 1, there are five labels, each label having a corresponding active region in the form of an interval with an upper (U) and lower (L) boundary. Label 1 has the corresponding interval 125 with upper boundary $U_1$ and lower boundary $L_1$. Label 2 has the corresponding interval 130 with upper boundary $U_2$ and lower boundary $L_2$. Label 3 has the corresponding interval 135 with upper boundary $U_3$ and lower boundary $L_3$. Label 4 has the corresponding interval 140 with upper boundary $U_4$ and lower boundary $L_4$. Label 5 has the corresponding interval 145 with upper boundary $U_5$ and lower boundary $L_5$.

The test example 120 is projected onto the filter line 110 at point 122. In an embodiment, the projection of the test example 120 is achieved using a feature vector representation of the object being queried. Other means of projecting the test example 120 may also be applied.

The projection 122 of the test example 120 falls within the intervals for labels 2 (130) and 4 (140). Therefore, labels 2 and 4 are selected for evaluation by the classifier. The intervals for labels 1 (125), 3 (135), and 5 (145) fall outside of the test example 120 and are therefore not considered for evaluation by the classifier.

In an embodiment, the label filter 100 is based on linear projections. In this embodiment, the label filter 100 can be learned directly from data and consists of a filtering line parameterized by $w \in \mathbb{R}^d$, and one active region or active interval $\{(L_k, U_k)\}$ on the filtering line for each label $k \in \{1, \ldots, K\}$.

Given a test example $x \in \mathbb{R}^d$, the label filter 100 calculates the projection $x_p = \langle w, x \rangle$ on the filtering line and selects all labels whose active region contains $x_p$, i.e., all labels that have passed the relevancy constraints according to the projected test example. That is, all labels k such that $L_k < x_p < U_k$ are retained by the filter as potential candidate labels to be considered and further evaluated by the base multi-label or multiclass classifier. All labels whose active region does not contain $x_p$ are deemed irrelevant and will not be considered or evaluated by the base classifier.

The cost of running a label filter 100 on a test example 110 is O(d) for the projection and O(log(2K)) for a binary search to determine on which segment of the filtering line the projection falls.

In one example, a training set $(x_i, y_i)_{i=1 \ldots n}$ is given, wherein $y_i \subset \{1, \ldots, K\}$ represents the set of labels assigned to example $x_i$ (cardinality of $y_i$ is 1 for multiclass problems). Given this training set, filter parameters w, $L_k$, and $U_k$ can be inferred by solving the following optimization problem (1):

$$\min_{\substack{w,L,U \\ s,\xi}} \|w\|^2 + C_1 \sum_{i=1}^{n} \sum_{k \in y_i} (\xi_{ik}^L + \xi_{ik}^U) + C_2 \sum_{i=1}^{n} \sum_{k' \notin y_i} (\xi_{ik'}^L + \xi_{ik'}^U)$$

Such that:
For all i, $k \in y_i$:

$L_k - \langle w, x_i \rangle + 1 \leq \xi_{ik}^L$ $$\langle w, x_i \rangle - U_k + 1 \leq \xi_{ik}^U \qquad (2)$$

For all i, $k' \notin y_i$:

$s_{ik'}(\langle w, x_i \rangle - L_{k'} + 1) \leq \xi_{ik'}^L$ $$(1 - s_{ik'})(U_{k'} - \langle w, x_i \rangle + 1) \leq \xi_{ik'}^U \qquad (3)$$

For all i, k:

$s_{ik} \in \{0,1\}; \xi_{ik}^L \geq 0; \xi_{ik}^U \geq 0,$ where: $C_1$ is a hyperparameter that controls the strength of constraint 2; $C_2$ is a hyperparameter that controls the strength of constraint 3; $\xi$ is a slack variable that allows the constraints to be violated at a penalty; i is an index over the examples; y is a label set for an example; x is a numeric representation of an example; and s represents a switch that determines which of the two constraints should be enforced.

Intuitively, the constraints (2) require that the projections of each training example fall within the active interval(s) of its label(s). The constraints (3) require the projections of a training example fall outside the active intervals of classes not in its label set. That is, the projection of example i should not fall in the interval corresponding to class $k' \notin y_i$. It should fall either on the left (when $s_{ik'} = 1$) or on the right (when $s_{ik'} = 0$) of the interval corresponding to class $k' \notin y_i$. Slack variables $\xi_{ik}$ allow some constraints to be violated, at a cost. $C_1$ weights the cost of an example falling outside the interval of a class in its label set, and $C_2$ weights the cost of an example falling within the interval of a class not in its label set. In usual problems, there will be O(n·K) constraints of type (3) and only O(n) constraints of type (2), so $C_1$ should be on the order of O(K·$C_2$).

The optimization problem above encodes the desired intuition that examples be projected within the intervals corresponding to their labels and outside the intervals corresponding to other labels. However, two examples, i and j, having the same label k, could have $s_{ik'} \neq s_{jk'}$. This could lead to local minimas where the interval for label k' is nested within the interval for label k increasing the overlap among intervals and reducing the performance of the filter. To alleviate this potential problem, the following optimization problem (4) is solved instead of problem (1).

$$\min_{\substack{w,L,U \\ \Pi,\xi}} \|w\|^2 + C_1 \sum_{i=1}^{n} \sum_{k \in y_i} (\xi_{ik}^L + \xi_{ik}^U) + C_2 \sum_{i=1}^{n} \sum_{k \in y_i} \sum_{k' \notin y_i} \xi_{ikk'}$$

Such that:
For all i, $k \in y_i$:

$L_k - \langle w, x_i \rangle + 1 \leq \xi_{ik}^L$ $$\langle w, x_i \rangle - U_k + 1 \leq \xi_{ik}^U \qquad (5)$$

For all $i$, $k \in y_i$, $k' \notin y_i$:

$$\langle w, x_i \rangle - L_k + 1 \leq \xi_{ikk'} \text{ if } \Pi(k) < \Pi(k')$$

$$U_k - \langle w, x_i \rangle + 1 \leq \xi_{ikk'} \text{ if } \Pi(k) > \Pi(k') \quad (6)$$

For all $i$, $k \in y_i$, $k' \notin y_i$:

$$\xi_{ik}^L \geq 0; \xi_{ik}^U \geq 0; \xi_{ikk'} \geq 0,$$

where: $\Pi$ is an ordering over the K labels; $C_1$ is a hyperparameter that controls the strength of constraint 2; $C_2$ is a hyperparameter that controls the strength of constraint 3; $\xi$ is a slack variable that allows the constraints to be violated at a penalty; $i$ is an index over the examples; $y$ is a label set for an example; $x$ is a numeric representation of an example; and $s$ represents a switch that determines which of the two constraints should be enforced. Intuitively, the constraints (6) require the projections of all examples with some label $k$ to fall to the right of intervals corresponding to labels lower than $k$ in the ordering $\Pi$.

Optimization problems (1) and (4) can be solved via alternating minimization: optimization w, L, U with $s_{ik}$ or $\Pi$ fixed, and optimize $s_{ik}$ or $\Pi$ with w, L, U fixed.

Optimizing w, L, U with $s_{ik}$ or $\Pi$ fixed is a convex problem with linear constraints and can be solved via any convex optimization technique.

The types of problems that require label filtering will tend to have a large number of training instances. In an embodiment, an averaged stochastic projected sub-gradient descent is used in the implementation of the optimization problem and, rather than fully optimizing w, L, and U, a fixed number of gradient descent iterations is performed before updating the ordering $\Pi$. Each gradient descent iteration takes $O(d+K)$ time. If K is very large, the gradient computation can be sped up by sampling a subset of $K' \ll K$ of the constraints (6) uniformly at random at each gradient iteration and ignoring the rest.

If both w and $s_{ik}$ or $\Pi$ are fixed, L and U can be optimized exactly in $O(n \cdot d + n \cdot \log(n) + n \cdot K)$ time. With w and $s_{ik}$ or $\Pi$ fixed, the optimization problem (1) or (4) decomposes into independent optimization problems for each $L_k$ and $U_k$ with convex objectives that are piece-wise linear and can be minimized via a linear scan though the data. This optimization is too computationally expensive to apply after every update of w, so, in an embodiment, it is only used at the beginning of the optimization to initialize L and U, and at the end of the optimization to obtain the final L and U values.

In an embodiment, to optimize $\Pi$ with w, L, and U fixed, the following heuristic is used that takes $O(n \cdot d + K \cdot \log(K))$ time: project all the training instances that have label $k$ on the line determined by the current w and calculate the mean of these projections. Then order the labels by these mean projected values.

In another embodiment, if guaranteed convergence to a local minima is desired, $\Pi$ is treated as a set of $K^2/2$ pairwise constraints between labels, rather than a total ordering. This embodiment requires an $O(n \cdot d + K^2)$ operation.

In another embodiment, if solving optimization problem (1) is desired, with w, L, and U fixed, the optimal $s_{ik}$ is 1 if $\langle w, x_i \rangle < (U_k + L_k)/2$ and 0 otherwise.

In an embodiment, multiple label filters 100 are used. The use of multiple label filters 100 can further reduce the test-time computational burden. While a single label filter 100 may not be expressive enough to reliably eliminate a large number of labels by itself, combining multiple label filters 100 can substantially increase the number of eliminated labels as long as the filters are diverse and eliminate different sets of labels for a test example.

Since the optimization problem (4) is non-convex, different label filters 100 can be obtained by using different initializations. In an embodiment, in order to make the label filters 100 more diverse, the label filters 100 are trained in a sequential manner, and each label filter 100 is encouraged to focus only on the labels that have not been eliminated by the previous label filters 100. For example, if a previous label filter 100 eliminated label k' for a training example i (i.e. the projection of example $x_i$ on w falls outside the interval ($L_{k'}$, $U_{k'}$) for some previous filter), then the constraints (6) that involve the example $x_i$ and the label k' are eliminated when training the current filter 100. In an embodiment, the hyper-parameter for the current filter $C_2$ is increased to compensate for the removed constraints.

Figure 2:
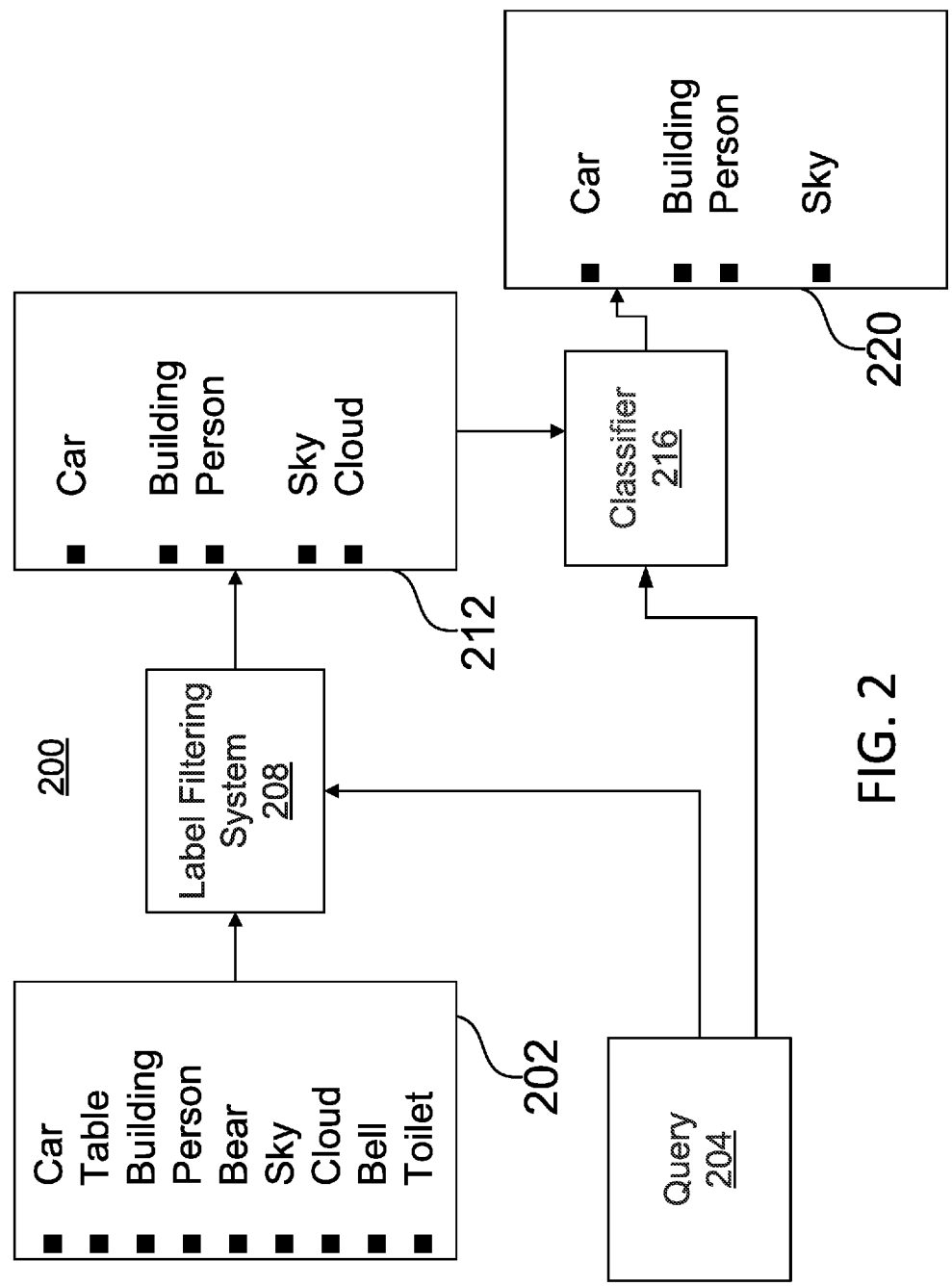
FIG. 2 is a block/flow diagram illustrating a high-level system for assigning labels or tags to a queried object, in accordance with an embodiment of the present principles.

Referring now to FIG. 2, a block/flow diagram illustrating a high-level system 200 for assigning labels or tags 220 to a queried object 204, using a label filtering system 208, is illustratively depicted in accordance with an embodiment of the present principles.

Label filtering systems 208 can be used to speed up any multi-label classification system that requires a linear scan over labels in a label set. This affords a user the flexibility to use the best classification system for the task at hand, which can yield significant performance gains.

As shown in FIG. 2, a label filtering system 208 receives a large set of labels or tags 202 (including, e.g., "Car," "Table," "Building," "Person," "Bear," "Sky," "Cloud," "Bell," "Toilet," etc.), and a query example/instance 204 (such as, e.g., an image, document, song, customer, etc.) to be classified or tagged. In an embodiment, multiple label filtering systems 208 are used in conjunction.

In an embodiment, the label filtering system 208 identifies labels or tags, from the set of labels or tags 202, that are not relevant to the query 204 and that can be safely eliminated from further consideration. After the irrelevant tags or labels are eliminated, the label filtering system 208 preselects a small subset of labels or tags 212 that are potentially relevant for the query example 204, using the process described in FIG. 1.

Once the label filtering system 208 preselects the small subset of labels or tags 212, the small subset of labels or tags 212 is sent to a classifier 216. The classifier 216 evaluates the labels or tags within the small subset of labels or tags 212 and assigns labels or tags 220 to the query example 204. Since the preselected set of labels or tags 212 is much smaller than the entire set of labels or tags 202, the assignment process is much faster than if the classifier 216 evaluated the entire set of labels or tags 202.

Figure 3:
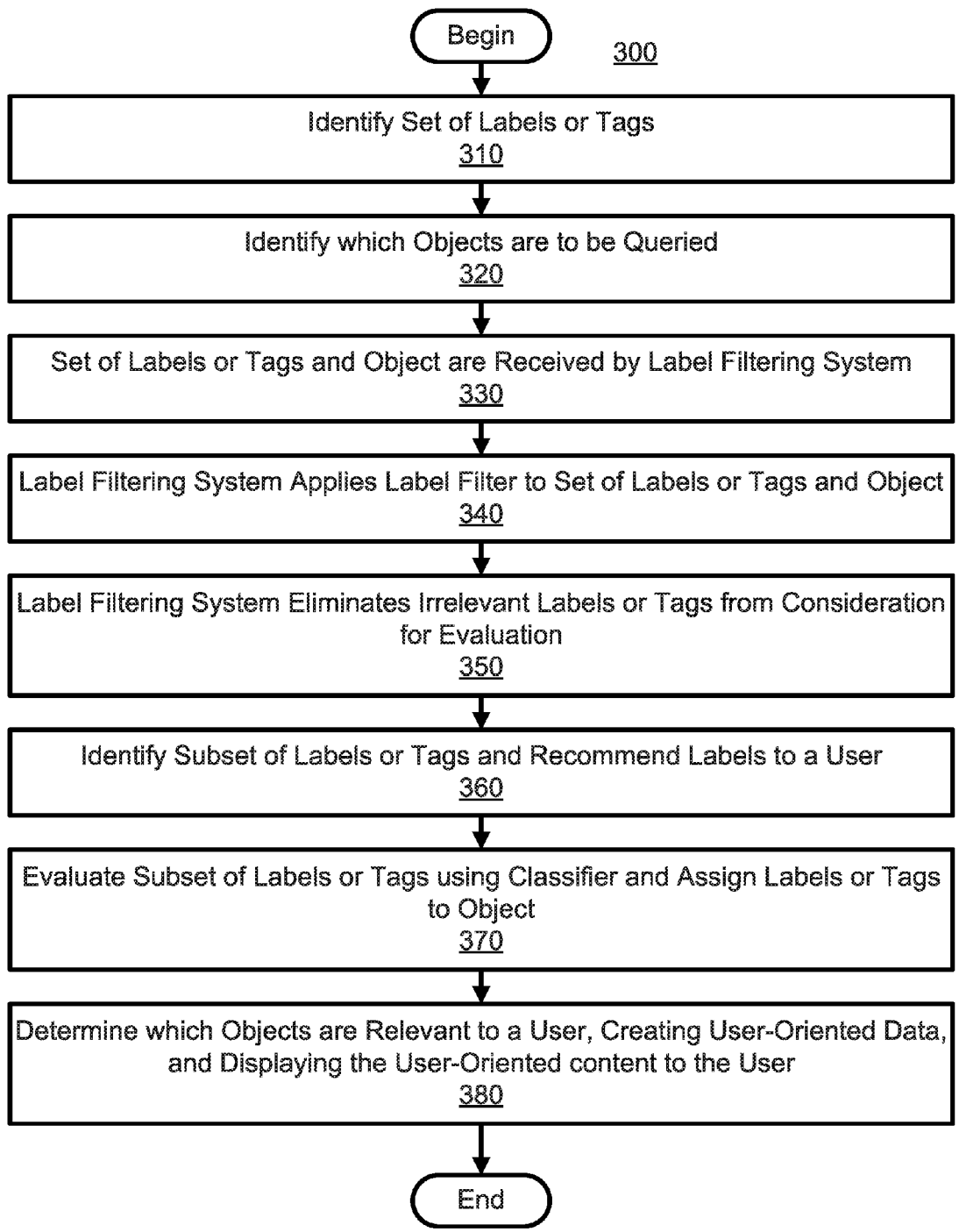
FIG. 3 is a flowchart illustrating a method for assigning labels or tags to a queried object, using a label filtering system, in accordance with an embodiment of the present principles.

Referring now to FIG. 3, a flowchart illustrating a method 300 for assigning labels or tags to a queried object, using a label filtering system, is illustratively depicted in accordance with an embodiment of the present principles.

At block 310, a set of labels or tags is identified for further use by a label filtering system.

At block 320, at least one object to be queried is identified. Each of the objects will be assigned labels or tags from the set of labels or tags identified in block 310. The objects may be obtained via a physical device such as, e.g., a camera, an audio recording device, a graphical user interface, etc.

At block 330, the set of labels or tags and each of the objects to be queried are received by a label filtering system. In an embodiment, more than one label filtering system is used in conjunction.

At block 340, the label filtering system applies a label filter to the set of labels or tags and each of the objects to be queried. The label filter identifies labels or tags in the set of labels or tags that are irrelevant to each of the objects being queried.

At block 350, after the irrelevant labels or tags are identified, the label filtering system eliminates the irrelevant labels or tags from consideration for evaluation by the classifier.

At block 360, after the irrelevant labels or tags are eliminated, the label filtering system identifies a subset of labels or tags that are possibly relevant to the queried object or objects. In an embodiment, labels that are potentially relevant to an object are recommended to a user prior to the labels being assigned to the object. Labels can be recommended to any or all of the queried objects.

At block 370, the subset of labels or tags is sent to a classifier. The classifier evaluates the subset of labels and tags to determine which labels or tags are relevant to the objects being queried. The classifier then assigns the relevant labels or tags to each of the queried objects.

At block 380, based on the labels or tags assigned to each of the objects, objects relevant to a user are determined. In an embodiment, user-oriented is created from this determination, wherein the user-oriented content includes content consisting of at least one object determined to be relevant to a user. In an embodiment, the user-oriented content is displayed to a user on, e.g., a computer display, a television, a cell phone, a graphical user interface, etc.

In an embodiment, the user-oriented content includes advertisements which may be displayed on, e.g., a computer display, a television, a cell phone, a graphical user interface, etc. In an embodiment, the criteria for determining which objects are relevant to the user may be, e.g., the content of a webpage (including the title of the webpage), any user-inputted data, the browsing history of the user, etc.

Figure 4:
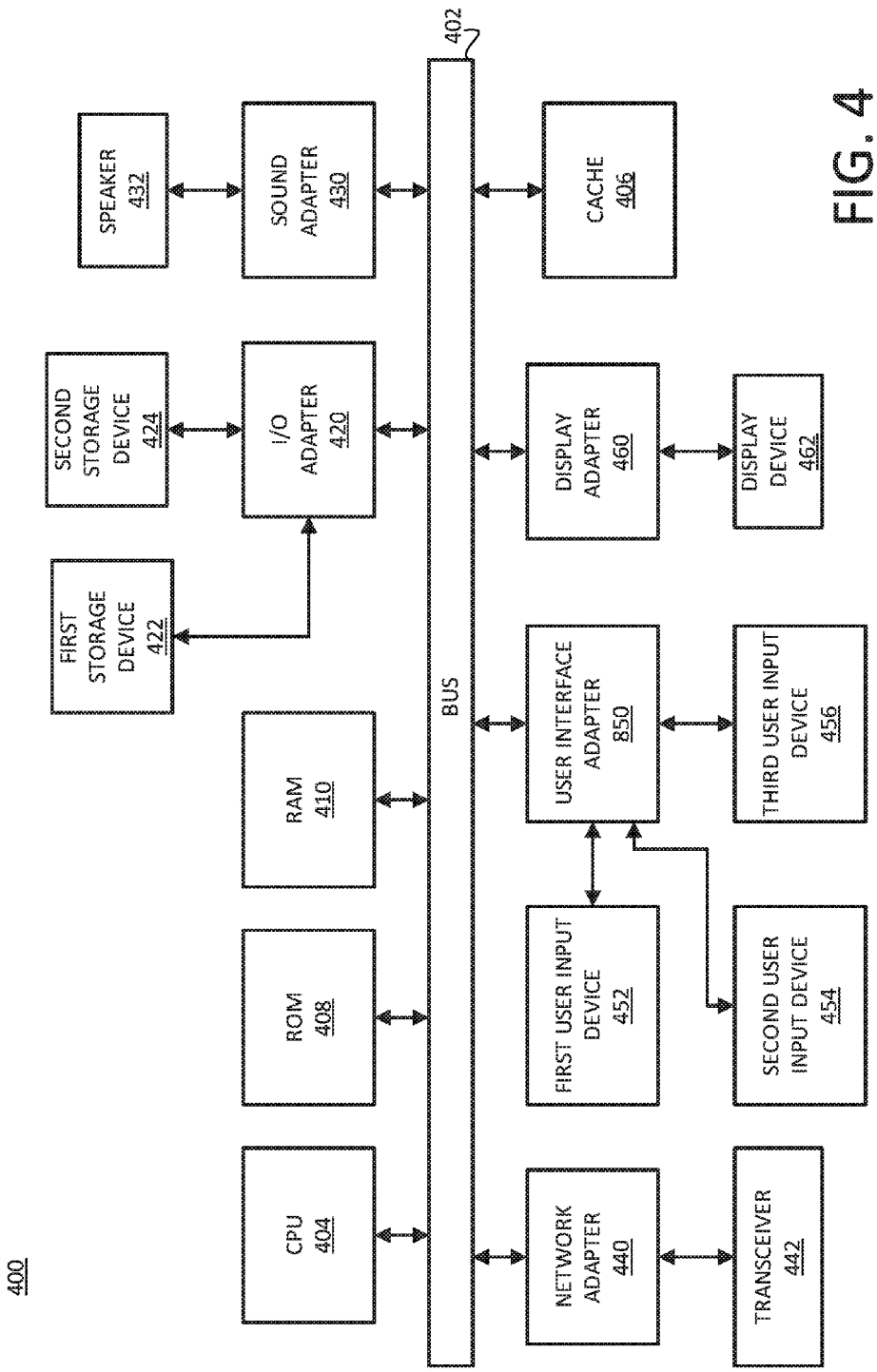
FIG. 4 is a block/flow diagram illustrating an exemplary processing system to which the present principles may be applied, in accordance with an embodiment of the present principles.

Referring now to FIG. 4, an exemplary processing system 400, to which the present principles may be applied, is illustratively depicted in accordance with an embodiment of the present principles. The processing system 400 includes at least one processor (CPU) 404 operatively coupled to other components via a system bus 402. The system bus 402 may be connected to any components via a wired or wireless connection. A cache 106, a Read Only Memory (ROM) 408, a Random Access Memory (RAM) 410, an input/output (I/O) adapter 420, a sound adapter 430, a network adapter 440, a user interface adapter 450, and a display adapter 460, are operatively coupled to the system bus 102.

A first storage device 422 and a second storage device 424 are operatively coupled to system bus 402 by the I/O adapter 120. The storage devices 422 and 424 can be any of a disk storage device (e.g., a magnetic or optical disk storage device), a solid state magnetic device, and so forth. The storage devices 422 and 424 can be the same type of storage device or different types of storage devices.

A speaker 432 is operatively coupled to system bus 402 by the sound adapter 430. A transceiver 442 is operatively coupled to system bus 402 by network adapter 440. A display device 462 is operatively coupled to system bus 402 by display adapter 460.

A first user input device 452, a second user input device 454, and a third user input device 456 are operatively coupled to system bus 402 by user interface adapter 450. The user input devices 452, 454, and 456 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 452, 454, and 456 can be the same type of user input device or different types of user input devices. The user input devices 452, 454, and 456 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present principles provided herein.

Moreover, it is to be appreciated that system 200, described with respect to FIG. 2 is a system for implementing respective embodiments of the present principles. Part or all of processing system 400 may be implemented in one or more of the elements of system 200 of FIG. 2.

Further, it is to be appreciated that processing system 400 may perform at least part of the methods described herein including, for example, at least part of method 300 of FIG. 3. Similarly, part or all of system 200 of FIG. 2 may be used to perform at least part of the methods described herein including, for example, at least part of method 300 of FIG. 3.

Figure 5:
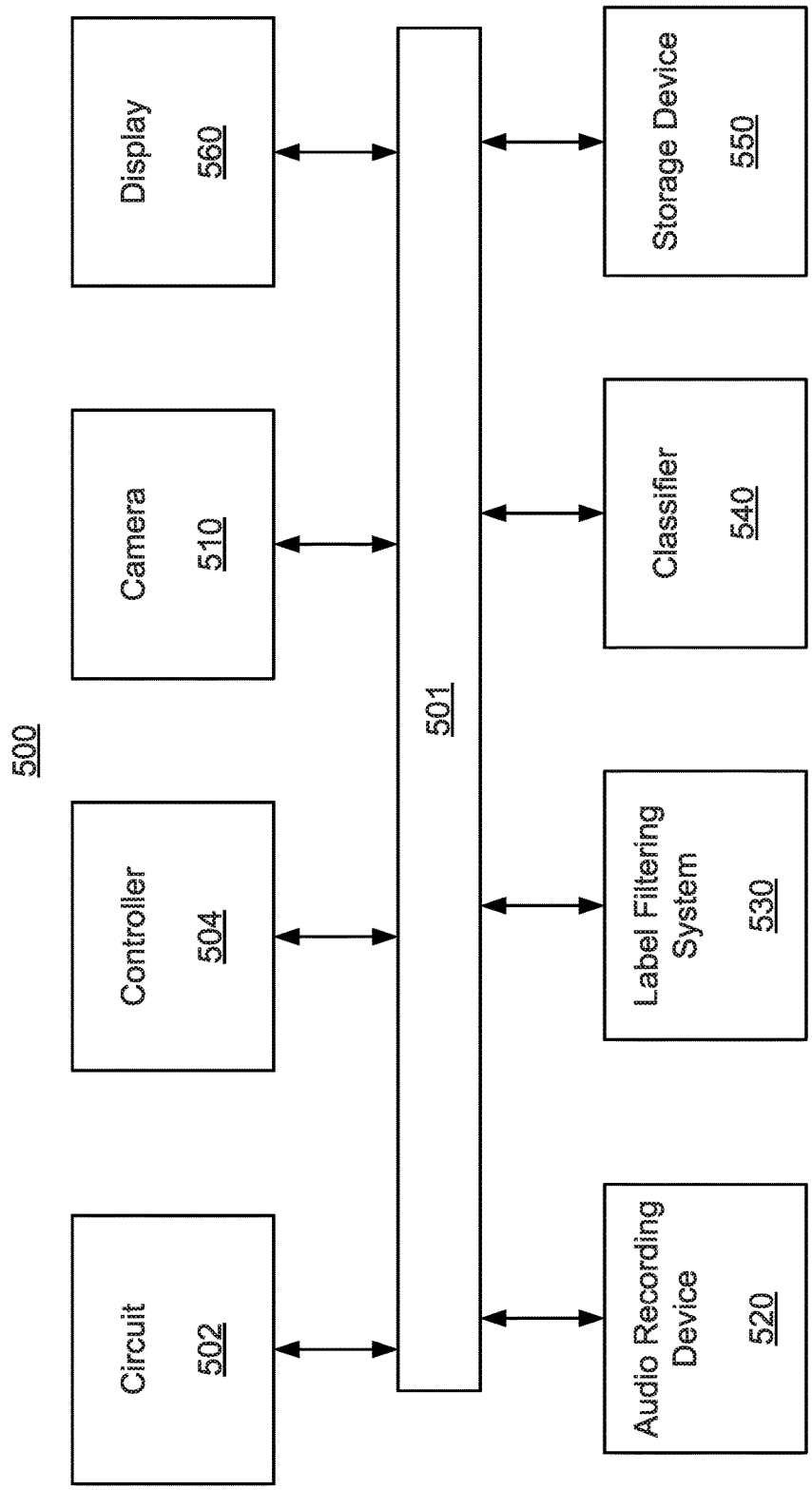
FIG. 5 is an exemplary system for assigning labels to a queried object, in accordance with an embodiment of the present principles.

Referring now to FIG. 5, an exemplary system 500 for assigning tags or labels to a queried object is illustratively depicted in accordance with an embodiment of the present principles.

While many aspects of system 500 are described in singular form for the sakes of illustration and clarity, the same can be applied to multiples ones of the items mentioned with respect to the description of system 5000. For example, while a single label filtering system 530 may be mentioned with respect to system 500, more than one label filtering system 530 can be used in accordance with the teachings of the present principles, while maintaining the spirit of the present principles. Moreover, it is appreciated that the label filtering system 530 is but one aspect involved with system 500 than can be extended to plural form while maintaining the spirit of the present principles.

In an embodiment, the system 500 may include a plurality of components, which may include one or more circuits 502, controllers 504, cameras 510, audio recording devices 520, classifiers 540, storage devices 550 (e.g., computer readable storage medium), and/or displays 560. The above components may be connected by, for example, a bus 501, and data (e.g., system condition data, temperature, voltage, etc.) may be collected according to various embodiments of the present principles. The bus may be connected to any components via a wired or wireless connection.

In an embodiment, a camera 510 may be employed to capture an image to be queried and assigned labels or tags by the classifier 540. In an embodiment, an audio recording device 520 may be employed to record an audio recording to be queried and assigned labels or tags by the classifier 540. The camera 510 and audio recording device 520 may be connected to a bus 501 via a wired or wireless connection. At least one storage device 550 may be employed to store, e.g., sets of labels or tags and objects to be queried, such as, e.g., an image captured by the camera 510, an audio recording recorded by the audio recorder 520, etc.

A label filtering system 530 may be employed to apply a label filter to the queried object and the set of labels and filters. The label filtering system may be further employed to determine which labels or tags in the set of labels or tags are irrelevant to the queried object, eliminate those labels or tags from consideration for evaluation, and create a subset of labels or tags consisting of labels or tags that are possibly relevant to the queried object.

A classifier 540 may be employed for receiving the queried object and the subset of labels or tags, analyzing the labels or tags in the subset of labels or tags with the queried object to determine which labels or tags in the subset of labels or tags are relevant to the queried object. The classifier 540 may be further employed to assign, to the queried object, the labels or tags that the classifier 540 has identified as relevant to the queried object. At least one display 560 may be employed to display any of the information and data input or output from the system 500, including, e.g., the objects to be queried, the labels or tags, the user-oriented content, etc.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for assigning labels to an object, comprising:
receiving, by a storage device, a set of labels and at least one object to be assigned labels;
applying, using a processor, a label filter to the set of labels and to each of the at least one objects, wherein the label filter is based on a linear projection on a geometric filtering manifold having a plurality of active regions and the label filter utilizes filter parameters determined by an optimization problem;
identifying, for each of the at least one objects, which labels in the set of labels are irrelevant based on a determination if the linear projection is within active regions on the geometric filtering manifold corresponding to a label;
eliminating labels in the set of labels that are irrelevant to each of the at least one objects, based on relevancy criteria, from further consideration;
creating, using the processor, a subset of labels for each of the at least one objects, the subset of labels consisting of labels in the set of labels that have not been eliminated from consideration;
determining, using a multi-label classifier, for each of the at least one objects, which labels in the subset of labels are relevant to the object by analyzing the subset of labels in conjunction with the object;
assigning, to each of the at least one objects, the labels that are relevant to the object;
determining, using the processor, which of the at least one objects are relevant to a user, based on the labels assigned to each of the at least one objects, to create user-oriented content, the user-oriented content consisting of at least one object determined to be relevant to a user; and
displaying the user-orientated content to the user,
wherein the optimization problem utilized to determine filter parameters comprises one of the following optimization problems:

$$\min_{w,L,U,s,\xi} \|w\|^2 + C_1 \sum_{i=1}^{n} \sum_{k \in y_i} (\xi_{ik}^L + \xi_{ik}^U) + C_2 \sum_{i=1}^{n} \sum_{k' \notin y_i} (\xi_{ik'}^L + \xi_{ik'}^U) \quad (i)$$

Such that:
For all i, k∈y$_i$:

$L_k - \langle w, x_i \rangle + 1 \leq \xi_{ik}^L$ $\langle w, x_i \rangle - U_k + 1 \leq \xi_{ik}^U$ For all i, k'∉y$_i$:

$s_{ik'}(\langle w, x_i \rangle - L_k + 1) \leq \xi_{ik'}^L$ $(1 - s_{ik'})(U_k - \langle w, x_i \rangle + 1) \leq \xi_{ik'}^U$ For all i, k:

$s_{ik} \in \{0,1\}; \xi_{ik}^L \geq 0; \xi_{ik}^U \geq 0$, wherein $C_1$ is a hyperparameter that controls a strength of a constraint 2; $C_2$ is a hyperparameter that controls a strength of a constraint 3; $\xi$ is a slack variable that allows the constraints to be violated at a penalty; i is an index over examples; y is a label set for an example; x is a numeric representation of an example; and s represents a switch that determines which of the constraints should be enforced;

or $$\min_{w,L,U,\Pi,\xi} \|w\|^2 + C_1 \sum_{i=1}^{n} \sum_{k \in y_i} (\xi_{ik}^L + \xi_{ik}^U) + C_2 \sum_{i=1}^{n} \sum_{k \in y_i} \sum_{k' \notin y_i} \xi_{ikk'} \quad (ii)$$

Such that:
For all i, k∈y$_i$:

$L_k - \langle w, x_i \rangle + 1 \leq \xi_{ik}^L$ $\langle w, x_i \rangle - U_k + 1 \leq \xi_{ik}^U$ For all i, k∈y$_i$, k'∉y$_i$:

$\langle w, x_i \rangle - L_k + 1 \leq \xi_{ikk'}$ if $\Pi(k) < \Pi(k')$ $U_k - \langle w, x_i \rangle + 1 \leq \xi_{ikk'}$ if $\Pi(k) > \Pi(k')$ For all i, k∈y$_i$, k'∉y$_i$:

$\xi_{ik}^L \geq 0; \xi_{ik}^U \geq 0; \xi_{ikk'} \geq 0$, wherein Π is an ordering over K labels; $C_1$ is a hyperparameter that controls a strength of a constraint 2; $C_2$ is a hyperparameter that controls a strength of a constraint 3; $\xi$ is a slack variable that allows the constraints to be violated at a penalty; i is an index over examples; y is a label set for an example; x is a numeric representation of an example; and s represents a switch that determines which of the constraints should be enforced.

2. The method as recited in claim 1, further comprising recommending potential labels to the user prior to the labels being assigned to at least one of the at least one objects.

3. The method as recited in claim 1, wherein the user-oriented content includes advertisements.

4. The method as recited in claim 3, wherein criteria used in the determining which of the at least one objects are relevant to a user is selected from the group consisting of content of a webpage, user-inputted data, and user browsing history.

5. The method as recited in claim 1, wherein each of the at least one objects is selected from the group consisting of an image, an audio recording, a video recording, a document, and a customer.

6. The method as recited in claim 1, wherein the identifying further comprises projecting a test example onto a filter line to determine which labels have bounds within which the test example is projected, wherein the filter line includes at least one label, each label having an upper boundary and a lower boundary.

7. The method as recited in claim 6, wherein the projecting further comprises using a feature vector representation of the object.

8. A system for assigning labels to an object, comprising:
a storage device configured to store a set of labels and at least one object to be assigned labels;
at least one processor configured to:
apply a label filter to the set of labels and to each of the at least one objects, wherein the label filter is based on a linear projection on a geometric filtering manifold having a plurality of active regions and the label filter utilizes filter parameters determined by an optimization problem;
identify which labels in the set of labels are irrelevant to each of the at least one objects based on a determination if the linear projection is within active regions on the geometric filtering manifold corresponding to a label;
eliminate labels in the set of labels that are irrelevant to each of the at least one objects, based on relevancy criteria, from further consideration;
create a subset of labels, for each of the at least one objects, consisting of labels in the set of labels that have not been eliminated from consideration;
analyze, for each of the at least one objects, the subset of labels in conjunction with the object;
determine which labels in the subset of labels are relevant to each of the at least one objects;
assign, to the object, the labels that are relevant to the object;
determine, based on the labels assigned to each of the at least one objects, which of the at least one objects are relevant to a user in order to create user-oriented content, the user-oriented content consisting of at least one object determined to be relevant to a user; and
display the user-orientated content to the user,
wherein the optimization problem utilized to determine filter parameters comprises one of the following optimization problems:

$$\min_{\substack{w,L,U,\\s,\xi}} \|w\|^2 + C_1 \sum_{i=1}^{n} \sum_{k \in y_i} (\xi_{ik}^L + \xi_{ik}^U) + C_2 \sum_{i=1}^{n} \sum_{k' \notin y_i} (\xi_{ik'}^L + \xi_{ik'}^U) \quad \text{(i)}$$

Such that:
For all i, k∈$y_i$:

$L_k - \langle w, x_i \rangle + 1 \leq \xi_{ik}^L$ $\langle w, x_i \rangle - U_k + 1 \leq \xi_{ik}^U$ For all i, k'∉$y_i$:

$s_{ik'}(\langle w, x_i \rangle - L_{k'} + 1) \leq \xi_{ik'}^L$ $(1 - s_{ik'})(U_{k'} - \langle w, x_i \rangle + 1) \leq \xi_{ik'}^U$ For all i, k:

$s_{ik} \in \{0,1\}; \xi_{ik}^L \geq 0; \xi_{ik}^U \geq 0$, wherein $C_1$ is a hyperparameter that controls a strength of a constraint 2; $C_2$ is a hyperparameter that controls a strength of a constraint 3; ξ is a slack variable that allows the constraints to be violated at a penalty; i is an index over examples; y is a label set for an example; x is a numeric representation of an example; and s represents a switch that determines which of the constraints should be enforced;

or $$\min_{\substack{w,L,U,\\\Pi,\xi}} \|w\|^2 + C_1 \sum_{i=1}^{n} \sum_{k \in y_i} (\xi_{ik}^L + \xi_{ik}^U) + C_2 \sum_{i=1}^{n} \sum_{k \in y_i} \sum_{k' \notin y_i} \xi_{ikk'} \quad \text{(ii)}$$

Such that:
For all i, k∈$y_i$:

$L_k - \langle w, x_i \rangle + 1 \leq \xi_{ik}^L$ $\langle w, x_i \rangle - U_k + 1 \leq \xi_{ik}^U$ For all i, k∈$y_i$, k'∉$y_i$:

$\langle w, x_i \rangle - L_{k'} + 1 \leq \xi_{ikk'}$, if Π(k)<Π(k')

$U_{k'} - \langle w, x_i \rangle + 1 \leq \xi_{ikk'}$, if Π(k)>Π(k')

For all i, k∈$y_i$, k'∉$y_i$:

$\xi_{ik}^L \geq 0; \xi_{ik}^U \geq 0; \xi_{ikk'} \geq 0$, wherein Π is an ordering over K labels; $C_1$ is a hyperparameter that controls a strength of a constraint 2; $C_2$ is a hyperparameter that controls a strength of a constraint 3; ξ is a slack variable that allows the constraints to be violated at a penalty; i is an index over examples; y is a label set for an example; x is a numeric representation of an example; and s represents a switch that determines which of the constraints should be enforced.

9. The system as recited in claim 8, wherein the object is selected from the group consisting of an image, an audio recording, a document, and a customer.

10. The system as recited in claim 9, wherein the processor is further configured to recommend potential labels to the user prior to the labels being assigned to at least one of the at least one objects.

11. The system as recited in claim 8, wherein the user-oriented content includes advertisements.

12. The system as recited in claim 8, wherein criteria used to determine which of the at least one objects are relevant to a user is selected from the group consisting of content of a webpage, user-inputted data, and user browsing history.

13. The system as recited in claim 8, wherein the projector is further configured to project a test example onto a filter line to determine which labels have bounds within which the test example is projected, wherein the filter line includes at least one label, each label having an upper boundary and a lower boundary.

14. The system as recited in claim 13, wherein the processor is further configured to use, in the projection of the test example, a feature vector representation of the object.

15. A non-transitory computer-readable storage medium including a computer-readable program for assigning labels to an object, wherein the computer-readable program when executed on a computer causes the computer to perform the steps of:

receiving, by a storage device, a set of labels and at least one object to be assigned labels;

applying, using a processor, a label filter to the set of labels and to each of the at least one objects, wherein the label filter is based on a linear projection on a geometric filtering manifold having a plurality of active regions and the label filter utilizes filter parameters determined by an optimization problem;

identifying, for each of the at least one objects, which labels in the set of labels are irrelevant based on a determination if the linear projection is within active regions on the geometric filtering manifold corresponding to a label;

eliminating labels in the set of labels that are irrelevant to each of the at least one objects, based on relevancy criteria, from further consideration;

creating, using the processor, a subset of labels for each of the at least one objects, the subset of labels consisting of labels in the set of labels that have not been eliminated from consideration;

determining, using a multi-label classifier, for each of the at least one objects, which labels in the subset of labels are relevant to the object by analyzing the subset of labels in conjunction with the object;

assigning, to each of the at least one objects, the labels that are relevant to the object;

determining, using the processor, which of the at least one objects are relevant to a user, based on the labels assigned to each of the at least one objects, to create user-oriented content, the user-oriented content consisting of at least one object determined to be relevant to a user; and displaying the user-orientated content to the user, wherein the optimization problem utilized to determine filter parameters comprises one of the following optimization problems:

$$\min_{\substack{w,L,U,\\s,\xi}} \|w\|^2 + C_1 \sum_{i=1}^{n} \sum_{k \in y_i} (\xi_{ik}^L + \xi_{ik}^U) + C_2 \sum_{i=1}^{n} \sum_{k' \notin y_i} (\xi_{ik'}^L + \xi_{ik'}^U) \quad (i)$$

Such that:
For all i, $k \in y_i$:

$$L_k - \langle w, x_i \rangle + 1 \leq \xi_{ik}^L$$

$$\langle w, x_i \rangle - U_k + 1 \leq \xi_{ik}^U$$

For all i, $k' \notin y_i$:

$$s_{ik'}(\langle w, x_i \rangle - L_{k'} + 1) \leq \xi_{ik'}^L$$

$$(1 - s_{ik'})(U_{k'} - \langle w, x_i \rangle + 1) \leq \xi_{ik'}^U$$

For all i, k:

$$s_{ik} \in \{0,1\}; \xi_{ik}^L \geq 0; \xi_{ik}^U \geq 0,$$

wherein $C_1$ is a hyperparameter that controls a strength of a constraint 2; $C_2$ is a hyperparameter that controls a strength of a constraint 3; $\xi$ is a slack variable that allows the constraints to be violated at a penalty; i is an index over examples; y is a label set for an example; x is a numeric representation of an example; and s represents a switch that determines which of the constraints should be enforced;

or $$\min_{\substack{w,L,U,\\\Pi,\xi}} \|w\|^2 + C_1 \sum_{i=1}^{n} \sum_{k \in y_i} (\xi_{ik}^L + \xi_{ik}^U) + C_2 \sum_{i=1}^{n} \sum_{k \in y_i} \sum_{k' \notin y_i} \xi_{ikk'} \quad (ii)$$

Such that:
For all i, $k \in y_i$:

$$L_k - \langle w, x_i \rangle + 1 \leq \xi_{ik}^L$$

$$\langle w, x_i \rangle - U_k + 1 \leq \xi_{ik}^U$$

For all i, $k \in y_i$, $k' \notin y_i$:

$$\langle w, x_i \rangle - L_{k'} + 1 \leq \xi_{ikk'}, \text{ if } \Pi(k) < \Pi(k')$$

$$U_{k'} - \langle w, x_i \rangle + 1 \leq \xi_{ikk'}, \text{ if } \Pi(k) > \Pi(k')$$

For all i, $k \in y_i$, $k' \notin y_i$:

$$\xi_{ik}^L \geq 0; \xi_{ik}^U \geq 0; \xi_{ikk'} \geq 0,$$

wherein $\Pi$ is an ordering over K labels; $C_1$ is a hyperparameter that controls a strength of a constraint 2; $C_2$ is a hyperparameter that controls a strength of a constraint 3; $\xi$ is a slack variable that allows the constraints to be violated at a penalty; i is an index over examples; y is a label set for an example; x is a numeric representation of an example; and s represents a switch that determines which of the constraints should be enforced.

16. The computer-readable storage medium as recited in claim 15, wherein the identifying further comprises projecting a test example onto a filter line to determine which labels have bounds within which the test example is projected, wherein the filter line includes at least one label, each label having an upper boundary and a lower boundary.

17. The computer-readable storage medium as recited in claim 16, wherein the projecting further comprises using a feature vector representation of the object.

* * * * *